United States Patent
Zillmer et al.

(10) Patent No.: US 7,305,965 B2
(45) Date of Patent: Dec. 11, 2007

(54) METHOD FOR OPERATING A HYBRID MOTOR VEHICLE

(75) Inventors: Michael Zillmer, Sickte (DE); Matthias Holz, Lehre (DE); Ekkehard Pott, Gifhorn (DE); David Prochazka, Libosovice (CS)

(73) Assignees: Volkswagen AG, Wolfsburg (DE); Skoda Auto A.S., Mlada Boleslav (CZ)

( * ) Notice: Subject to any disclaimer, the term of this patent is extended or adjusted under 35 U.S.C. 154(b) by 0 days.

(21) Appl. No.: 11/526,430

(22) Filed: Sep. 25, 2006

(65) Prior Publication Data

US 2007/0068478 A1    Mar. 29, 2007

Related U.S. Application Data

(63) Continuation of application No. PCT/EP2004/013925, filed on Dec. 8, 2004.

(30) Foreign Application Priority Data

Apr. 3, 2004   (DE) ...................... 10 2004 016 559

(51) Int. Cl.
*F02D 3/00*    (2006.01)
*F02D 3/055*   (2006.01)

(52) U.S. Cl. .................................. 123/339.1

(58) Field of Classification Search ............ 123/339.1, 123/339.14, 192.1, 299; 180/65.2, 69.6, 180/69.3
See application file for complete search history.

(56) References Cited

U.S. PATENT DOCUMENTS

| 6,085,723 A | 7/2000 | Pels et al. |
| 6,176,807 B1 * | 1/2001 | Oba et al. ...................... 477/5 |
| 6,441,506 B2 * | 8/2002 | Nakashima ............... 290/40 C |
| 6,443,126 B1 * | 9/2002 | Morimoto et al. ..... 123/339.15 |
| 2006/0102393 A1 | 5/2006 | Tumback et al. |

FOREIGN PATENT DOCUMENTS

| DE | 197 09 134 A1 | 9/1998 |
| DE | 100 24 704 A1 | 11/2001 |
| DE | 103 09 326 A1 | 10/2003 |
| DE | 102 41 018 A1 | 3/2004 |
| EP | 1 380 745 A2 | 1/2004 |

* cited by examiner

*Primary Examiner*—Mahmoud Gimie
(74) *Attorney, Agent, or Firm*—Manfred Beck P.A.

(57) ABSTRACT

A method for operating a hybrid motor vehicle having an internal combustion engine and at least one electric machine is provided. At least one of the electric machines supplies a varying torque to the internal combustion engine such that cyclic irregularities of the internal combustion engine during idling are reduced and, at the same time, the internal combustion engine is operated during idling with an ignition angle and a volumetric efficiency optimized for this operating state and without retarding the ignition angle for building up a torque reserve.

11 Claims, 2 Drawing Sheets

METHOD FOR OPERATING A HYBRID MOTOR VEHICLE

CROSS-REFERENCE TO RELATED APPLICATIONS

This application is a continuation, under 35 U.S.C. § 120, of copending International Application No. PCT/EP2004/013925, filed Dec. 8, 2004, which designated the United States; this application also claims the priority, under 35 U.S.C. § 119, of German Patent Application No. DE 10 2004 016 559.9, filed Apr. 3, 2004; the prior applications are herewith incorporated by reference in their entirety.

BACKGROUND OF THE INVENTION

FIELD OF THE INVENTION

The invention relates to a method for operating a hybrid motor vehicle having an internal combustion engine and at least one electric machine, wherein at least one of the electric machines supplies a varying torque to the internal combustion engine during idling such that cyclic irregularities of the internal combustion engine during idling are reduced.

When operating a motor vehicle with an internal combustion engine, the internal combustion engine is generally not turned off when the vehicle is at a standstill and the internal combustion engine continues running in an idling operation during these standstill phases. A portion of the energy provided by the engine is used for supplying power for the vehicle electrical system and for comfort functions, such as for an air conditioning system. However, since during an idling operation, the engine needs a major portion of the energy, which is contained in the amount of fuel that is used, to maintain the engine running i.e. to compensate heat losses and frictional losses and, in addition, the engine operates in a thermodynamically inefficient range, it is energetically inefficient to keep the engine running when the vehicle is at a standstill. For this reason, there are already vehicles with an automatic engine start-stop function, which turns off the internal combustion engine when the vehicle is at a standstill in order to reduce the fuel consumption.

Turning off the internal combustion engine with a start-stop function during standstill periods is typically also done in hybrid motor vehicles. In this case it is advantageous that hybrid vehicles have electric motors that are substantially more powerful than a conventional starter motor, which allows for a higher degree of comfort, in particular when starting the engine. The electric machine can be connected to the engine crankshaft in a number of different ways. The electric engine can be connected via a clutch or directly to the crankshaft of the engine or can be coupled to the engine crankshaft via a belt drive or a gear drive. During the periods of standstill, power for electric loads is supplied by batteries or other electric energy storage devices which are recharged during a subsequent driving operation at operating points of the internal combustion engine that have a higher degree of efficiency. This way it is possible to achieve a noticeable reduction in the fuel consumption.

However, there are operating phases during which, due to other reasons, it is not permissible to turn off the internal combustion engine. For example, when the air conditioning system is turned on, it may be necessary to keep the internal combustion engine running due to the air conditioning compressor being mechanically driven via the belt drive of the internal combustion engine. Also, when the batteries are in states of low charge, in particular in the case of very long standstill phases, it may be necessary to keep the internal combustion engine running under idling conditions or it may be necessary to start up the internal combustion engine again. In addition, for example, the exhaust gas cleaning system must have reached its operating temperature so that no inadmissibly high exhaust gas pollutant emissions are generated when the internal combustion engine starts up again. Due to the above-mentioned reasons, it may be necessary even for hybrid systems to run the internal combustion engine in idling when the vehicle is at a standstill. However, especially with these systems, it is necessary to keep the fuel consumption during idling as low as possible.

One possible way of reducing the fuel consumption during idling is to lower the idling speed of the internal combustion engine as much as possible. The idling speed of internal combustion engines can however only be lowered to a given value because otherwise irregularities or fluctuations in the torque delivery of individual cylinders increase substantially such that the engine running quality becomes very poor or the engine stops running. The running of the engine is in this case made more difficult by variances in the injected fuel amount between individual cylinders, by reduced cylinder charges, by a low intensity of combustion chamber gas flows as well as an increased residual gas content in the combustion chamber. These factors cause, when the idling speed is lowered, an increase in stochastically imperfect combustion events which cause a brief, comfort-reducing undershoot or dip in the idling speed.

The idling speeds of three-cylinder engines and four-cylinder engines are therefore typically in a range from 750 rotations per minute to 900 rotations per minute. In the case of spark ignition engines having a direct injection, it is possible to set the idling speed to a lower speed than in the case of spark ignition engines having an intake manifold fuel injection, because due to the direct introduction of the fuel into the combustion chamber it is possible to have a very precise metering of the injected fuel quantity for the individual cylinders. Also, in the case of a larger number of cylinders, it is possible to set the idling speed to a slightly lower value due to the increased number of combustion events per rotation of the crankshaft.

A further problem are load or torque requests following right after an idling phase. For example, a sudden and significant increase in torque is required in a driveaway operation. However, since the charge build-up in the intake manifold requires a certain time (several hundred milliseconds), this can result in a dip or undershoot in the torque in case of an engine whose idling speed has been lowered to a lowest possible value when the engine is not under load and, in combination with a clutch engagement, can also result in an undesired undershoot in the rotational speed, which means that comfort suffers considerably. A similar undesired effect may occur during idling when for example a consumer or load, such as an air conditioning compressor, is switched on.

This is the reason why the idling speed for production engines is set such that it has a given distance from a bottom, i.e. minimum, predetermined idling threshold speed. In addition, so-called torque reserves are oftentimes used. In this case, the ignition angle for a spark ignition engine is retarded to a greater extent than necessary for an operation that is optimized for torque and, respectively, for fuel consumption. In order to maintain the set idling speed it is necessary to increase the cylinder charge at the same time. In case of a sudden load request, it is now possible to first advance the ignition angle in order to increase torque. This results, practically without any time delay, in a higher torque because the ignition angle can be adjusted very fast, i.e. already in the next following working cycle. The safety distance between the idling speed and the minimum threshold idling speed as well as the torque reserve result in an undesired increase of the fuel consumption.

German Patent Application Publication No. DE 197 09 134 A1 discloses a drive system for a hybrid motor vehicle with an internal combustion engine and an electric machine which supplies a varying torque to the internal combustion engine such that cyclic irregularities of the internal combustion engine, i.e. an irregular rotational speed of the internal combustion engine, are reduced. The electric machine, which is coupled to the internal combustion engine, is in this case controlled such that it provides a varying torque that counteracts the torque fluctuations of the internal combustion engine.

SUMMARY OF THE INVENTION

It is accordingly an object of the invention to provide a method for operating a hybrid motor vehicle which overcomes the above-mentioned disadvantages of the heretofore-known methods of this general type and which reduces idling fuel consumption of the hybrid system and which improves the cooperation between the internal combustion engine and the electric machine and which at the same time maintains a desired driving comfort.

With the foregoing and other objects in view there is provided, in accordance with the invention, a method for operating a hybrid motor vehicle, which includes the steps of:

supplying, with an electric machine of a hybrid motor vehicle, a varying torque to an internal combustion engine of the hybrid motor vehicle during an idling operation of the internal combustion engine such that cyclic irregularities in the idling operation of the internal combustion engine are reduced; and concurrently operating the internal combustion engine during the idling operation with an ignition angle and a volumetric efficiency optimized for a present operating state and without retarding the ignition angle for building up a torque reserve.

In other words, according to the invention, there is provided a method for operating a hybrid motor vehicle having an internal combustion engine and at least one electric machine, wherein at least one of the electric machines supplies a varying torque to the internal combustion engine during idling such that cyclic irregularities of the internal combustion engine during idling are reduced, and wherein at the same time the internal combustion engine, when idling, is operated with an ignition angle and a volumetric efficiency optimized for this operating state without retardation of the ignition angle for building up a torque reserve.

An advantage of the method according to the invention is that by doing away with the otherwise customary retardation of the ignition angle and, incidental to it, an increase in volumetric efficiency, it is possible to choose an extremely low idling speed, whereby a reduction in fuel consumption is achieved and, at the same time, the desired operating comfort and driving comfort are maintained.

Another mode of the method according to the invention includes adjusting the ignition angle and/or the volumetric efficiency during idling for an operation of the internal combustion engine optimized with respect to fuel consumption when idling.

A preferred mode of the method according to the invention includes operating the internal combustion engine during idling with Lambda equal to one (stoichiometric air/fuel mixture).

A further mode of the method according to the invention includes supplying a driveaway-torque with at least one of the electric machines during a driveaway process starting from an idling speed.

Another mode of the method according to the invention includes impressing the driveaway-torque during a time of a charge build-up of the internal combustion engine.

In other words, in order to compensate for a lacking torque reserve, an adequately high driveaway-torque is provided by at least one of the electric machines during a driveaway process from an idling speed, wherein the driveaway-torque is preferably impressed in a period of time which the internal combustion engine needs for a charge build-up.

Yet another mode of the method according to the invention includes combining, during the idling operation, a speed control by interventions via an ignition path, a fuel path and/or a charge path with a speed control by at least one of the electric machines.

A further mode of the method according to the invention includes superimposing a speed control by at least one of the electric machines on a conventional speed control via an ignition path, a fuel path and/or a charge path.

Yet another mode of the method according to the invention includes reacting, with the speed control by at least one of the electric machines, only to stochastic, severe speed undershoots.

Another mode of the method according to the invention includes reducing an idling speed of the internal combustion engine by at least fifty rotations per minute, in particular by at least one hundred rotations per minute, and further by at least two hundred rotations per minute, respectively starting from a given threshold idling speed for the internal combustion engine at which the internal combustion engine exhibits a smooth idling operation and has sufficient reserves for a driveaway process without speed undershoots.

Other features which are considered as characteristic for the invention are set forth in the appended claims.

Although the invention is illustrated and described herein as embodied in a method for operating a hybrid motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In a hybrid vehicle with additionally at least one electric machine and an internal combustion engine provisions are made in accordance with the invention to improve idling fuel consumption as well as idling comfort. Since the electric machine can provide a high torque (positive and negative) especially at a low speed range, this offers the possibility to support the idling operation of an internal combustion engine in an advantageous manner. In addition, the electromotive torques can be increased and decreased extremely rapidly, i.e. within some tens of milliseconds, which provides the possibility of balancing out torque fluctuations and, respectively, the fluctuations in rotational speed of an internal combustion engine during idling.

In accordance with the invention, it is therefore proposed to lower the idling speed of an internal combustion engine with respect to an original specification or design by at least 50 rotations per minute, preferably by at least 100 rotations per minute and in particular preferably by 200 rotations per minute. The torque irregularities and, respectively, the resulting fluctuations in rotational speed are in this case balanced out or smoothed out via a combined speed control of the internal combustion engine and the electric machine. Alternatively, a combination of the conventional speed control of the internal combustion engine and a superimposed speed control of the electric machine is conceivable which reacts to undershoots in the rotational speed caused by stochastically imperfect combustion events and thus prevents inadmissible undershoots in the rotational speed. In accordance with a particularly preferred mode of the invention, it is recommended additionally not to use the conventional torque reserve (ignition-angle lead) any more. In addition, due to the high drive torque of the electric machine, the driveaway process from a lowest idling speed can be supported with only a small or no torque reserve so that also in this case comfort does not suffer because of undershoots in the rotational speed.

The proposed method thus allows a further reduction of the fuel consumption of hybrid vehicles and, respectively, drive concepts with a combination of an internal combustion engine and an electric machine.

Figure 1:
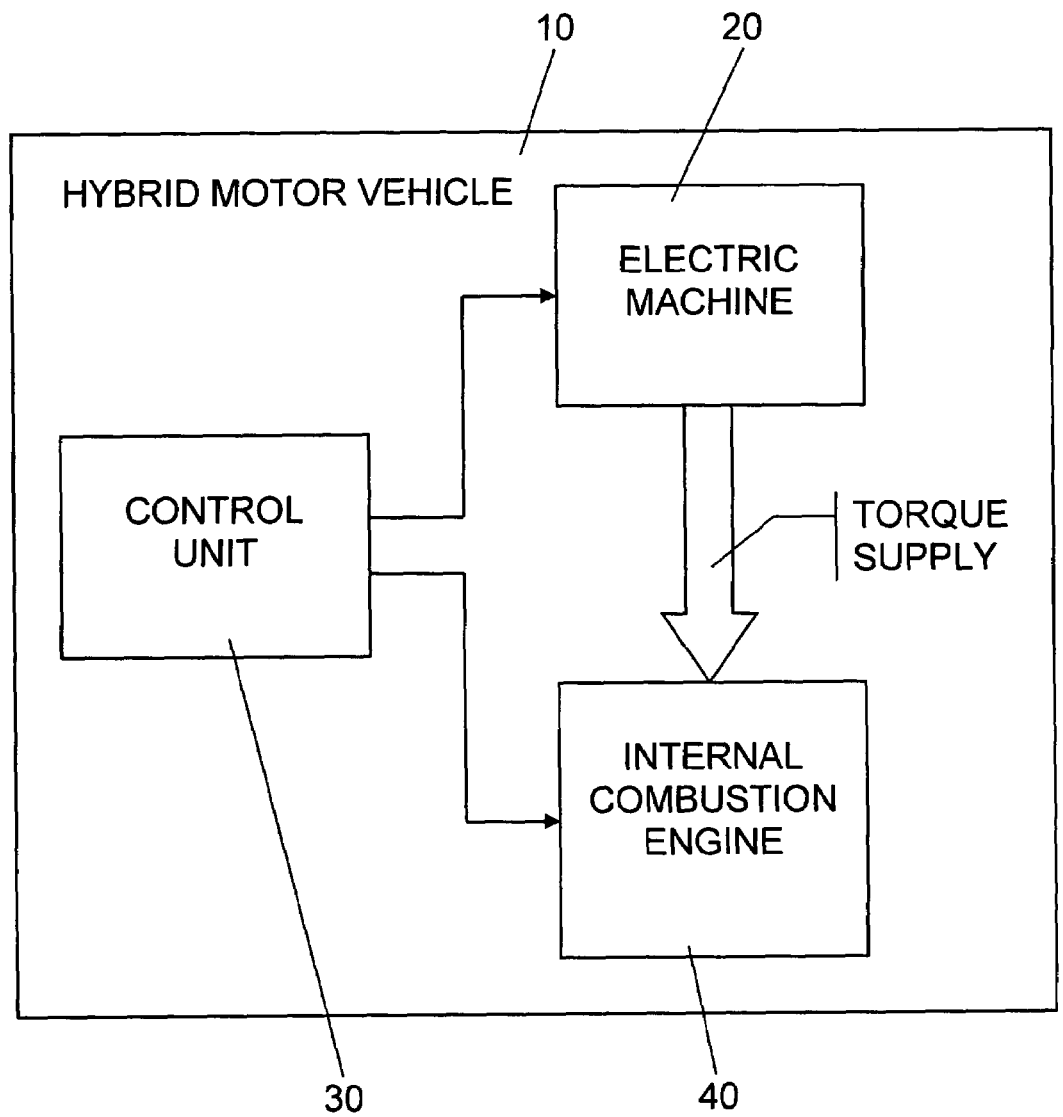
FIG. 1 is a block diagram illustrating a hybrid motor vehicle with an electric machine for supplying torque to an internal combustion engine in accordance with the invention.

FIG. 1 is a block diagram illustrating a hybrid motor vehicle 10 with an electric machine 20, an internal combustion engine 40, and a control unit 30. The control unit 30 is operatively connected to the internal combustion engine 40 and the electric machine 20 for controlling the speed of the internal combustion engine 40 and the electric machine 20 for improving idling fuel consumption and idling comfort as described above.

Figure 2:
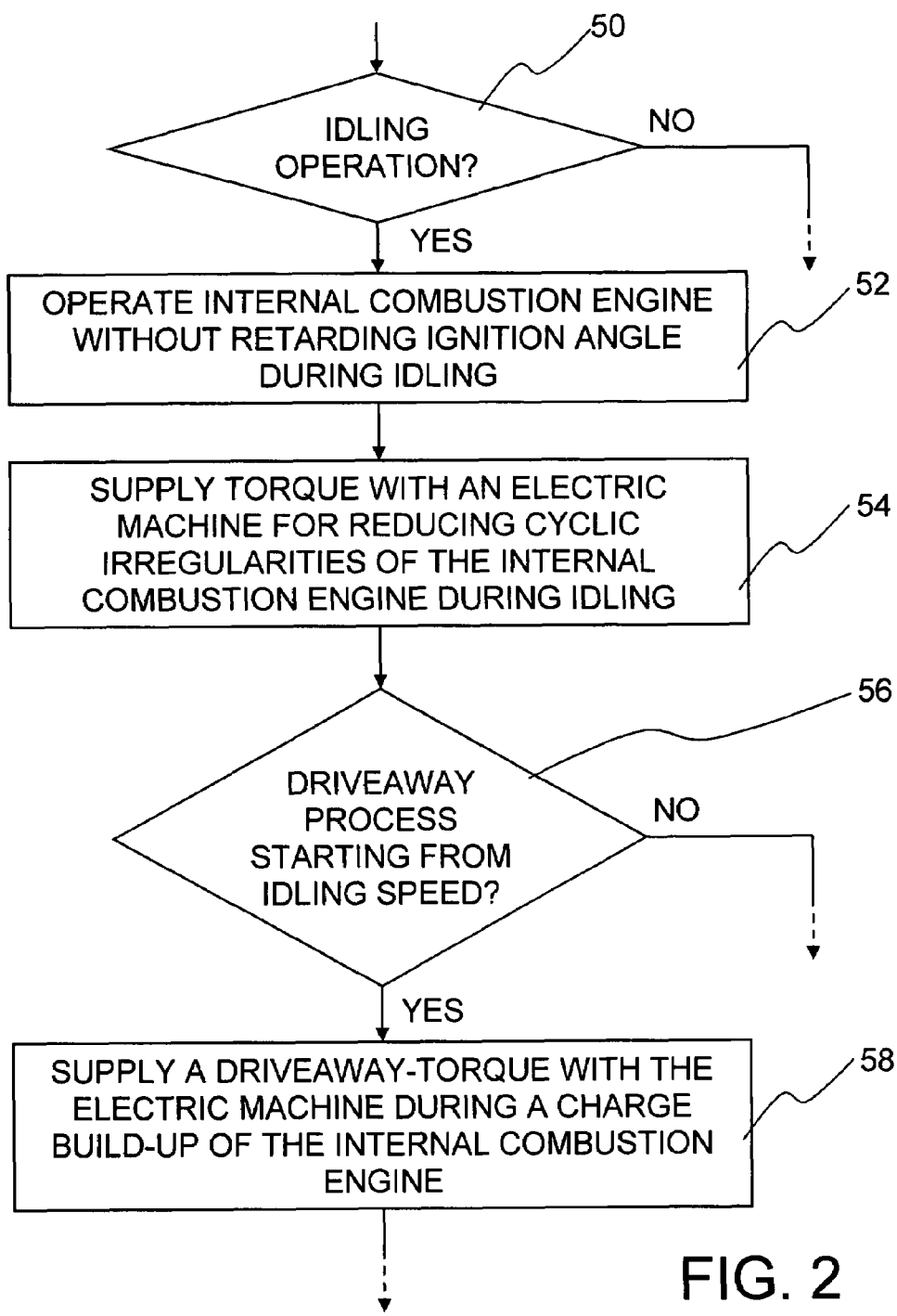
FIG. 2 is a flow chart illustrating main steps of an exemplary mode of the method for operating a hybrid motor vehicle according to the invention.

FIG. 2 is a flow chart illustrating main steps of an exemplary mode of the method for operating a hybrid motor vehicle according to the invention. In case of an idling operation (step 50), the internal combustion engine 40 operates with an ignition angle and a volumetric efficiency optimized for fuel consumption and operates without retarding the ignition angle for building up a torque reserve (step 52). The electric machine 20 supplies a varying torque to the internal combustion engine 40 such that cyclic irregularities in the idling operation of the internal combustion engine 40 are reduced (step 54). In case of a driveaway process starting from an idling speed (step 56), the electric machine 20 supplies a driveaway-torque during the time of a charge build-up of the internal combustion engine (step 58).

What is claimed is:

1. A method for operating a hybrid motor vehicle, which comprises:
  supplying, with an electric machine of a hybrid motor vehicle, a varying torque to an internal combustion engine of the hybrid motor vehicle during an idling operation of the internal combustion engine such that cyclic irregularities in the idling operation of the internal combustion engine are reduced; and
  concurrently operating the internal combustion engine during the idling operation with an ignition angle and a volumetric efficiency optimized for a present operating state and without retarding the ignition angle for building up a torque reserve.

2. The method according to claim 1, which comprises adjusting the ignition angle and the volumetric efficiency during idling for an operation of the internal combustion engine optimized with respect to fuel consumption when idling.

3. The method according to claim 1, which comprises operating the internal combustion engine during idling with Lambda substantially equal to one.

4. The method according to claim 1, which comprises supplying a driveaway-torque with the electric machine during a driveaway process starting from an idling speed.

5. The method according to claim 4, which comprises impressing the driveaway-torque during a time of a charge build-up of the internal combustion engine.

6. The method according to claim 1, which comprises combining, during the idling operation, a speed control by interventions via at least one path selected from the group consisting of an ignition path, a fuel path and a charge path with a speed control by the electric machine.

7. The method according to claim 1, which comprises superimposing a speed control by the electric machine on a conventional speed control via at least one path selected from the group consisting of an ignition path, a fuel path and a charge path.

8. The method according to claim 7, which comprises reacting, with the speed control by the electric machine, only to stochastic, severe speed undershoots.

9. The method according to claim 1, which comprises reducing an idling speed of the internal combustion engine by at least fifty rotations per minute starting from a given threshold idling speed for the internal combustion engine at which the internal combustion engine exhibits a smooth idling operation and has sufficient reserves for a driveaway process without speed undershoots.

10. The method according to claim 1, which comprises reducing an idling speed of the internal combustion engine by at least one hundred rotations per minute starting from a given threshold idling speed for the internal combustion engine at which the internal combustion engine exhibits a smooth idling operation and has sufficient reserves for a driveaway process without speed undershoots.

11. The method according to claim 1, which comprises reducing an idling speed of the internal combustion engine by at least two hundred rotations per minute starting from a given threshold idling speed for the internal combustion engine at which the internal combustion engine exhibits a smooth idling operation and has sufficient reserves for a driveaway process without speed undershoots.

* * * * *